(12) United States Patent
Han et al.

(10) Patent No.: US 10,180,904 B2
(45) Date of Patent: Jan. 15, 2019

(54) CACHE MEMORY AND OPERATION METHOD THEREOF

(71) Applicant: ELECTRONICS AND TELECOMMUNICATIONS RESEARCH INSTITUTE, Daejeon (KR)

(72) Inventors: Jin Ho Han, Seoul (KR); Young-Su Kwon, Daejeon (KR); Kyung Jin Byun, Daejeon (KR); Nak Woong Eum, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 57 days.

(21) Appl. No.: 15/241,902

(22) Filed: Aug. 19, 2016

(65) Prior Publication Data

US 2017/0255554 A1   Sep. 7, 2017

(30) Foreign Application Priority Data

Mar. 2, 2016 (KR) .................. 10-2016-0025201

(51) Int. Cl.
| | |
|---|---|
| *G06F 12/08* | (2016.01) |
| *G06F 12/0811* | (2016.01) |
| *G06F 12/084* | (2016.01) |
| *G06F 12/0842* | (2016.01) |
| *G06F 12/0875* | (2016.01) |

(52) U.S. Cl.
CPC ........ *G06F 12/0811* (2013.01); *G06F 12/084* (2013.01); *G06F 12/0842* (2013.01); *G06F 12/0875* (2013.01); *G06F 2212/6042* (2013.01); *G06F 2212/62* (2013.01)

(58) Field of Classification Search
CPC .............. G06F 12/0811; G06F 12/084; G06F 12/0842; G06F 12/0875; G06F 2212/6042; G06F 2212/608; G06F 2212/62
USPC ................................. 711/121, 122, 130, 141
See application file for complete search history.

(56) References Cited

U.S. PATENT DOCUMENTS

| | | | |
|---|---|---|---|
| 7,290,116 B1 * | 10/2007 | Grohoski ............ | G06F 12/0811 711/130 |
| 8,185,695 B2 | 5/2012 | Conway et al. | |
| 8,205,046 B2 | 6/2012 | Shaw et al. | |
| 2010/0235580 A1 * | 9/2010 | Bouvier ................ | G06F 12/084 711/129 |
| 2012/0137079 A1 | 5/2012 | Ueda | |
| 2014/0082300 A1 | 3/2014 | Han | |
| 2015/0143049 A1 | 5/2015 | Han et al. | |
| 2015/0149721 A1 * | 5/2015 | Kannan ................ | G06F 12/0811 711/122 |
| 2015/0242327 A1 * | 8/2015 | Guthrie ............... | G06F 12/0891 711/122 |

(Continued)

*Primary Examiner* — Gary J Portka
(74) *Attorney, Agent, or Firm* — Rabin & Berdo, P.C.

(57) ABSTRACT

Provided is a cache memory. The cache memory includes a first to Nth level-1 caches configured to correspond to first to Nth cores, respectively, a level-2 sharing cache configured to be shared by the first to Nth level-1 caches, and a coherence controller configured to receive an address from each of the first to Nth cores and allocate at least a partial area in an area of the level-2 sharing cache to one of the first to Nth level-1 caches based on the received address.

16 Claims, 11 Drawing Sheets

(56) References Cited

U.S. PATENT DOCUMENTS

2016/0109923 A1\* 4/2016 Chen ................... G06F 1/3296
  713/322

\* cited by examiner

CACHE MEMORY AND OPERATION METHOD THEREOF

CROSS-REFERENCE TO RELATED APPLICATIONS

This U.S. non-provisional patent application claims priority under 35 U.S.C. § 119 of Korean Patent Application No. 10-2016-0025201, filed on Mar. 2, 2016, the entire contents of which are hereby incorporated by reference.

BACKGROUND

The present disclosure relates to cache memory, and more particularly, to cache memory and an operation method thereof.

Cache memory is high-speed memory disposed between a processor and system memory in order to compensate an operating speed between the processor and the system memory (for example, SDRAM). The cache memory may temporarily store instructions or data requested from the processor.

In general, cache memory may include level-1 cache memory and level-2 cache memory. The level-1 cache memory may be directly connected to a processor and provide fast access. The level-2 cache memory may be positioned in a lower level of the level-1 cache memory and transmit/receive data to/from the level-1 cache memory.

In a multi-processor system, each of a plurality of processors may be connected to a different level-1 cache memory and share one level-2 cache memory. In this case, an issue may occur from the coherence on data stored in different level-1 cache memories. Recently, various techniques for maintaining such data coherence are under development.

SUMMARY

The present disclosure relates to cache memory for maintaining data coherence and improving access performance and an operation method thereof.

An embodiment of the inventive concept provides a cache memory including: first to Nth level-1 caches configured to correspond to first to Nth cores, respectively (where N is a natural number greater than 1); a level-2 sharing cache configured to be shared by the first to Nth level-1 caches; and a coherence controller configured to receive an address from each of the first to Nth cores and allocate at least a partial area of an area of the level-2 sharing cache to one of the first to Nth level-1 caches based on the received address.

In an embodiment, at least the partial area may correspond to a data unit accessed by each of the first to Nth cores.

In an embodiment, the coherence controller may include: a storage circuit configured to store map data; and first and Nth map controllers configured to receive the address from each of the plurality of cores, allow the first to Nth level-1 caches to access data corresponding to the received address, or allocate at least a portion of the level-2 sharing cache to one of the plurality of level-1 caches.

In an embodiment, the plurality of map controllers may communicate with the plurality of level-1 caches through a sharing bus.

In an embodiment, the first map controller among the first to Nth map controllers may receive the address from the first core among the first to Nth cores, and when information corresponding to at least a portion of the received address is not included in the map data, allocate an area where page data corresponding to the received address is stored in an area of the level-2 sharing cache to the first level-1 cache.

In an embodiment, the first map controller may store information on an ID of the first level-1 cache and an ID of the page data in the map data.

In an embodiment, the first map controller among the first to Nth map controllers may include: a map reader configured to receive the address from the first core and determine whether at least the portion of the received address is included in the map data; and a page allocation unit, when at least the portion of the received address is not included in the map data, configured to allocate an area where page data corresponding to the receive address in an area of the level-2 sharing cache to one of the first to Nth level-1 caches on the basis of an allocation information table.

In an embodiment, the coherence controller may further include an allocation information table including page allocation information allocated to each of the first to Nth level-1 caches, wherein the page allocation unit may be configured to allocate an area where the page data is stored to one of the first to Nth level-1 caches on the basis of the allocation information table.

In an embodiment, when page allocation information on the first level-1 cache is less than a threshold, the page allocation unit may allocate an area where the page data is stored to the first level-1 cache, and when the page allocation information on the first level-1 cache is greater than the threshold, allocate the area where the page data is stored to a level-1 cache having the smallest page allocation information among the second to Nth level-1 caches.

In an embodiment, each of the first to Nth level-1 caches may include: an instruction cache configured to store an instruction used in each of the first to Nth cores; and a data cache configured to temporarily store data used in the first to Nth cores.

In an embodiment, each of the first to Nth level-1 caches may operate based on a clock frequency different from that of the level-2 sharing cache, and each of the first to Nth level-1 caches may communicate with the level-2 sharing cache through a bus having a clock domain crossing (CDC) function.

In an embodiment, the cache memory may further include a cache eraser configured to receive a cache clear signal from at least one of the first to Nth cores, and erase the first to Nth level-1 caches and the level-2 sharing cache sequentially in response to the received cache clear signal, wherein the cache eraser may erase the first to Nth level-1 caches and the level-2 sharing cache sequentially on the basis of at least one among a plurality of address sets.

In an embodiment of the inventive concept, an operation method of a cache memory including a plurality of level-1 caches and a level-2 sharing cache includes: receiving an address from an external core; determining whether at least a portion of the received address is included in map data; if at least the portion of the received address is not included in the map data, allocating an area where page data corresponding to the received address in an area of the level-2 sharing cache to one of the plurality of level-1 caches; storing a cache ID of a level-1 cache where the area is allocated among the plurality of level-2 caches and at least a portion of the received address in the map data; and performing an access operation on one of the plurality of level-1 caches on the basis of the map data.

In an embodiment, if at least the portion of the received address is not included in the map data, the allocating of the area where the page data corresponding to the received address in the area of the level-2 sharing cache to the one of the plurality of level-1 caches may include allocating the area where the page data is stored to one of the plurality of level-1 caches on the basis of page allocation information including information on the number of pages allocated to the plurality of level-1 caches.

In an embodiment, the allocating of the area where the page data is stored to the one of the plurality of level-1 caches on the basis of the page allocation information including the information on the number of pages allocated to the plurality of level-1 caches includes: when allocation information on a level-1 cache corresponding to the external core among the plurality of level-1 caches is less than a threshold, allocating the area where the page data is stored to a level-1 cache corresponding to the external core; and when the allocation information on the level-1 cache corresponding to the external core among the plurality of level-1 caches is greater than the threshold, allocating the area where the page data is stored to one of the remaining level-1 caches.

In an embodiment, when the allocation information on the level-1 cache corresponding to the external core among the plurality of level-1 caches is greater than the threshold, the allocating of the area where the page data is stored to the one of the remaining level-1 caches may include allocating the area where the page data is stored to a level-1 cache having the smallest allocation information among the remaining level-1 caches.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
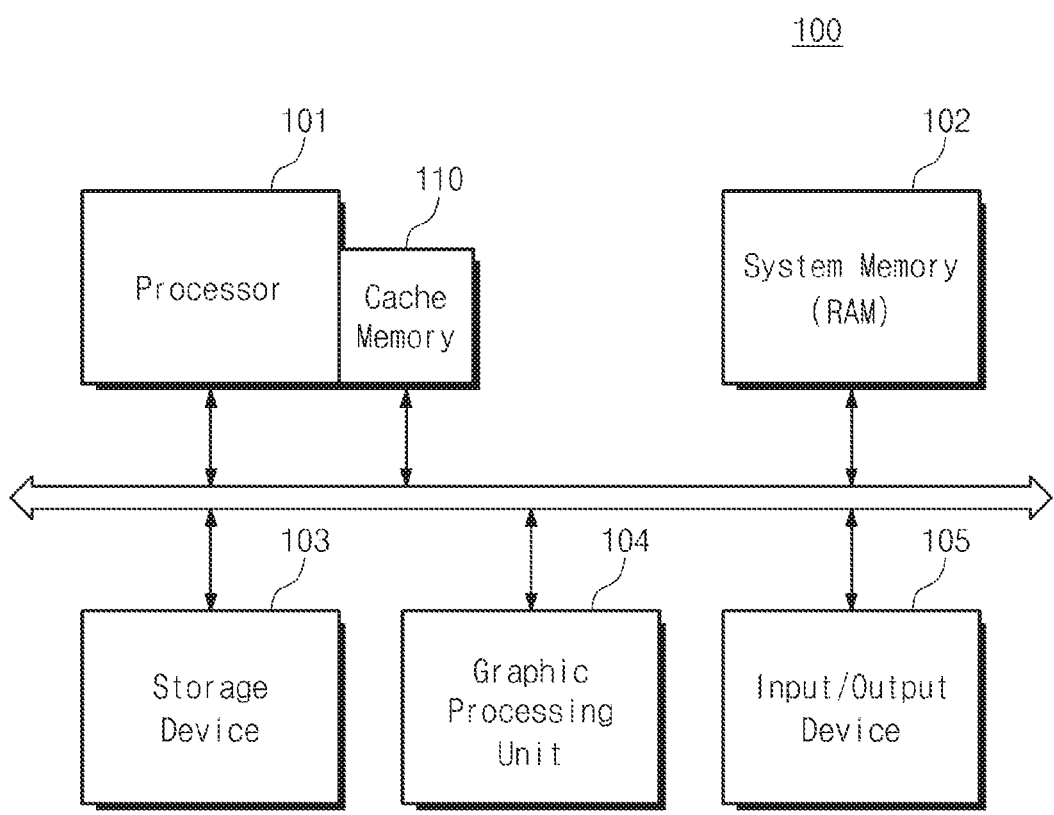
FIG. 1 is a block diagram illustrating a user system according to an embodiment of the inventive concept.

Hereinafter, embodiments of the inventive concept will be described in more detail with reference to the accompanying drawings. In the description below, details such as detailed configurations and structures are simply provided to help overall understanding. Therefore, without departing from the technical idea and scope of the inventive concept, modifications on embodiments described in this specification may be performed by those skilled in the art. Furthermore, description of well-known functions and structures are omitted for clarity and conciseness. The terms used herein are defined in consideration of functions of the inventive concept and are not limited to specific functions. The definition of terms may be determined based on the details in description.

Modules in drawings or detailed description below may be shown in the drawings or may be connected to another component other than components described in detailed description. Each of connections between modules or components may be direct or indirect. Each of connections between modules or components may be a connection by communication or a physical access.

FIG. 1 is a block diagram illustrating a user system according to an embodiment of the inventive concept. Referring to FIG. 1, a user system 100 includes a processor 101, a cache memory 110, a system memory 102, a storage device 103, a graphic processing unit 104, and an input/output device 105. In example embodiments, the user system 100 may be a computing system such as a computer, a notebook, a server, a work station, a mobile communication terminal, a Personal Digital Assistant (PDA), a Portable Media Player (PMP), a smartphone, a tablet, or a wearable device.

The processor 101 may control overall operations of the user system 100. The processor 101 may control overall operations of the user system 100.

The system memory 102 may be a buffer memory of the user system 100. For example, the system memory 102 may temporarily store a portion of information or data stored in the storage device 103 and provide it to the processor 101 or the cache memory 110. In example embodiments, the system memory 102 may include random access memories such as Static RAM (SRAM), Synchronous Dynamic Random Access Memory (SDRAM), Double Data Rate (DDR) SDRAM, Phase-change RAM (PRAM), Magnetic RAM (MRAM), Resistive RAM (RRAM), and Ferroelectric RAM (FRAM). The system memory 102 may directly communicate with the processor 101 or the cache memory 110 through a system bus.

The storage device 103 may be a mass storage medium for storing a variety of data or information used in the user system 100. In example embodiments, the storage device 103 may include a mass storage medium such as Hard Disk Drive (HDD), Solid State Drive (SSD), a memory stick, and a memory card.

The graphic processing unit 104 (GPU) may perform a series of arithmetic operations for outputting image data on information or data processed in the user system 100. In example embodiments, the GPU 104 may be mounted in a System on Chip (SoC) form in the processor 101.

The input/output device 105 includes various devices for inputting data or instructions to the user system 10 or outputting data or information to the outside. For example, the input/output device 105 may include user input devices such as a keyboard, a keypad, a button, a touch panel, a touch screen, a touch pad, a touch ball, a camera, a microphone, a gyroscope sensor, a vibration sensor, a piezoelectric element, a temperature sensor, a biometric sensor) and user output devices (such as a Liquid Crystal Display (LCD), an Organic Light Emitting Diode (OLED) display device, an Active Matrix OLED (AMOLED) display device, LED, a speaker, and a motor.

In example embodiments, an operating speed of the processor 101 is faster than that of the system memory 102 or the storage device 103. The cache memory 110 may provide a storage space or a storage device where the processor 101 can access fast. For example, the cache memory 110 may temporarily store a portion of information or data stored in the system memory 102 or the storage device 103 in order to allow the processor 101 to access data fast. In example embodiments, the cache memory 110 may include an external cache memory, an internal cache memory, a disk cache memory, a level-1 cache memory, and a level-2 cache memory. Alternatively, the cache memory 110 may be a high-speed memory device such as SRAM or a register.

In example embodiments, the cache memory 110 may be embedded in the processor 101. In example embodiments, the cache memory 110 may include a level-1 cache memory and a level-2 cache memory. In example embodiments, the processor 101 may be a multi-core processor and the cache memory 110 may include a plurality of level-1 caches and each of a plurality of cores in the processor 101 may directly access a different level-1 cache, respectively. In example embodiments, the processor 101 may be a multi-core processor and the cache memory 110 may include one level-2 cache and each of a plurality of cores in the processor 101 may share one level-2 cache.

As mentioned above, in a cache memory having a shared level-2 cache structure, a data coherence issue may occur between a shared level-2 cache and a plurality of level-1 caches. For example, a first core in the processor 101 may change first data of a level-1 cache in the cache memory 110 and if the changed first data is not updated in the shared level-2 cache, a second core in the processor 101 may access the first data. At this point, the second core may access the not-updated first data (that is, original data that is not the first data changed by the first core) through the shared level-2 cache. In this case, due to a data coherence issue, a normal operation may not be performed.

A cache memory according to an embodiment of the inventive concept dynamically allocates an area of a level-2 sharing cache to level-1 caches according to a data access order (that is, an address reception order), so that data coherence may be maintained and access performance may be improved at the same time. With reference to drawings below, a cache memory, a cache memory controller, and its operating method are described in more detail.

Figure 2:
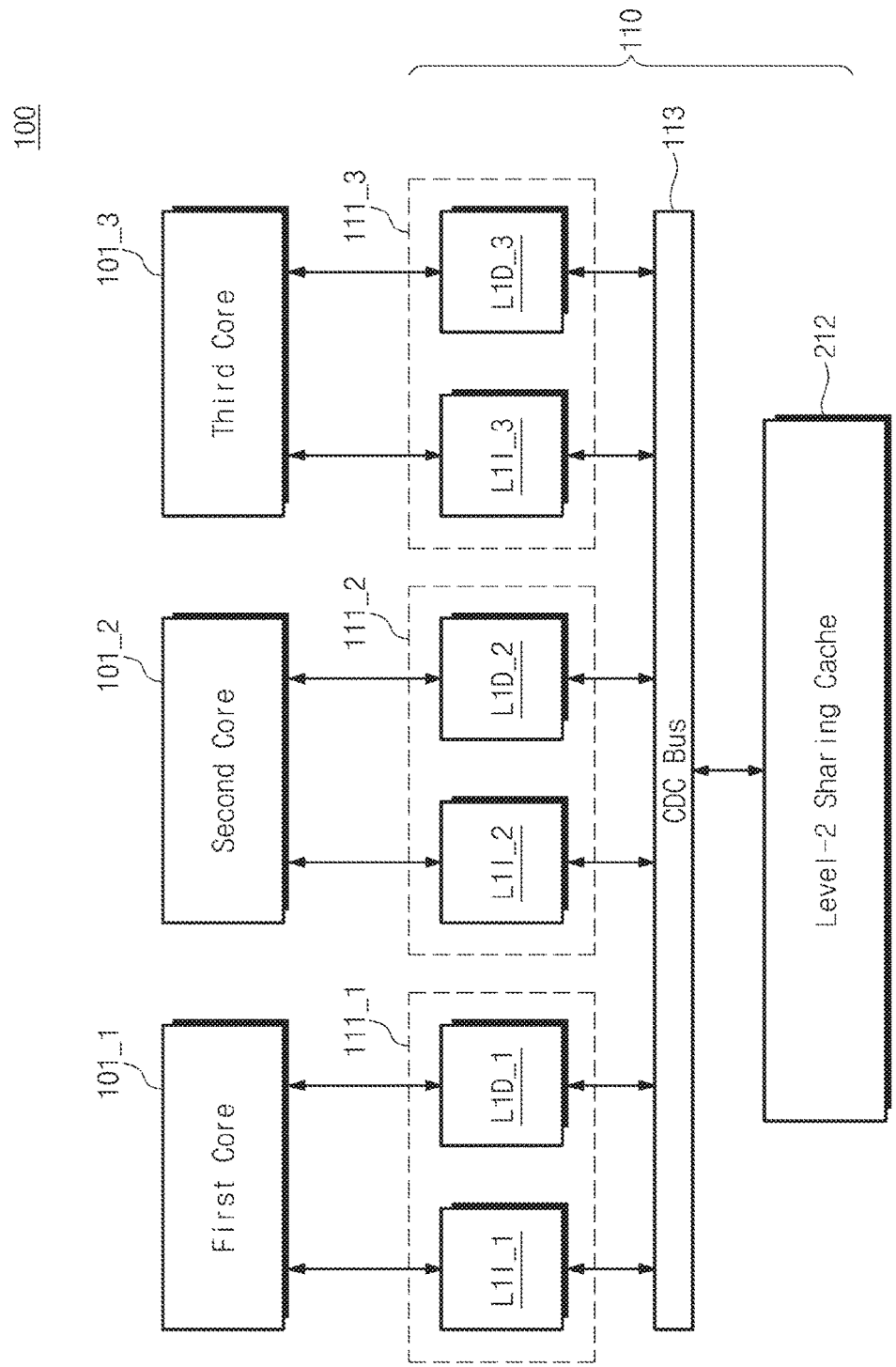
FIG. 2 is a block diagram illustrating a cache memory of FIG. 1.

FIG. 2 is a block diagram illustrating a cache memory of FIG. 1. For concise description, components unnecessary for describing a structure of a cache memory are omitted. Additionally, for concise description, it is assumed that the processor 101 is a multi-core processor including first to third cores 101_1 to 101_3. However, the scope of the inventive concept is not limited thereto, and the processor 101 may include two or more cores.

Referring to FIGS. 1 and 2, the cache memory 110 may include first to third level-1 caches 111_1, 111_2, and 111_3, a level-2 sharing cache 112, and a CDC bus 113. The first to third level-1 caches 111_1, 111_2, and 111_3 may include instruction caches L1I_1 L1I_2, and L1I_3 and data caches L1D_1, L1D_2, and L1D_3, respectively.

The first to third level-1 caches 111_1, 111_2, and 111_3 may be directly connected to the first to third cores 101_1, 101_2, and 101_3 of the processor 101, respectively. Alternatively, the first to third level-1 caches 111_1, 111_2, and 111_3 may directly access the first to third cores 101_1, 101_2, and 101_3 of the processor 101, respectively. For example, the first instruction cache L1I_1 and the first data cache L1D_1 of the first level-1 cache 111_1 may be directly accessed by the first core 101_1. The second instruction cache L1I_2 and the second data cache L1D_2 of the second level-1 cache 111_2 may be directly accessed by the second core 101_2. In the same manner, the third instruction cache L1I_3 and the third data cache L1D_3 of the third level-1 cache 111_3 may be directly accessed by the third core 101_3.

The first to third instruction caches L1I_1 to L1I_3 may provide instructions to the first to third cores 101_1 to 101_3, respectively. For example, the first to third instruction caches L1I_1 to L1I_3 may store instructions that are respectively provided to the first to third cores 101_1 to 101_3, and provide corresponding instructions to the first to third cores 101_1 to 101_3 according to a control of to the first to third cores 101_1 to 101_3.

The first to third data caches L1D_1 to L1D_3 may provide data to the first to third cores 101_1 to 101_3, respectively. For example, each of the first to third data caches L1D_1 to L1D_3 may store data stored in the level-2 sharing cache 112, and provide the stored data to the first to third cores 101_1 to 101_3 according to a request of the first to third cores 101_1 to 101_3, respectively.

In example embodiments, although not shown in the drawings, the first to third cores 101_1 to 101_3 may access the first to third data caches L1D_1 to L1D_3. For example, the first core 101_1 may access the second and third data caches L1D_2 and L1D_3 in addition to the first data cache L1D_1. However, a speed of accessing the second and third data caches L1D_2 and L1D_3 from the first core 101_1 may be lower than a speed of accessing the first data cache L1D_1 from the first core 101_1. This is because the first core 101_1 accesses the first data cache L1D_1 directly but accesses the second and third data caches L1D_2 and L1D_3 through an additional path. That is, a path through which the first core 101_1 accesses the second and third data caches L1D_2 and L1D_3 may be longer than a path through which the first core 101_1 accesses the first data cache L1D_1.

In the same manner, the second core 101_2 may access the first and third data caches L1D_1 and L1D_3 in addition to the second data cache L1D_2, and at this point, an access speed for the first and third data caches L1D_1 and L1D_3 may be slower than an access speed for the second data cache L2D_2.

In the same manner, the third core 101_3 may access the first and second data caches L1D_1 and L1D_2 in addition to the third data cache L1D_3, and at this point, an access speed for the first and second data caches L1D_1 and L1D_2 may be slower than an access speed for the third data cache L2D_3.

The level-2 sharing cache 112 may receive data from the system memory 102 and temporarily store the received data. The level-2 sharing cache 112 may communicate with the first to third level-1 caches 111_1 to 111_3 and provide the temporarily stored data to the first to third level-1 caches 111_1 to 111_3. That is, the first to third level-1 caches 111_1 to 111_3 may share the level-2 sharing cache 112.

In example embodiments, the first to third data caches L1D_1 to L1D_3 may communicate with the level-2 sharing cache 112 through the CDC bus 113. For example, the first to third data caches L1D_1 to L1D_3 and the level-2 sharing cache 112 may operate by using different clocks. The CDC bus 113 may be a bus for supporting a clock domain crossing function.

Hereinafter, for concise description, the first level-1 cache 111_1 is called a direct L1 cache of the first core 101_1 and the second and third level-1 caches 111_2 and 111_3 are called an indirect L1 cache of the first core 101_1. Herein, the indirect L1 cache may indicate the direct L1 cache of cores (that is, the second or third core 111_2 or 111_3) different from the first core 101_1. However, the scope of the inventive concept is not limited thereto. Additionally, the above-mentioned terms are simply assumed to describe an embodiment of the inventive concept concisely, and the technical features of the inventive concept are not limited by the above-mentioned terms.

Figure 3:
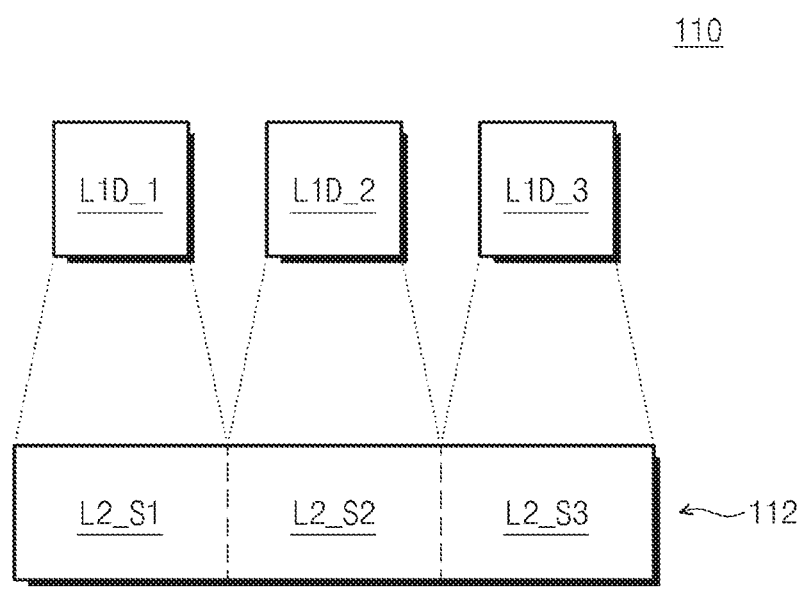
FIG. 3 is a view illustrating an operation for maintaining data coherence on first to third level-1 caches and a level-2 sharing cache of FIG. 2.

FIG. 3 is a diagram for describing an operation for maintaining data coherence on first to third level-1 caches and a level-2 sharing cache of FIG. 2. For concise description, components unnecessary for describing data coherence maintenance are omitted.

Referring to FIGS. 2 and 3, a cache memory 110 may include first to third data caches L1D_1 to L1D_3 and a level-2 sharing cache 112.

The level-2 sharing cache 112 may be divided into first to third sub areas L2_S1 to L2_S3. At this point, the first to third sub areas L2_S1 to L2_S3 may be physically-divided spaces. Alternatively, the first to third sub areas L2_S1 to L2_S3 may be logically-divided spaces. The first to third sub areas L2_S1 to L2_S3 may be predetermined spaces.

In order to maintain data coherence, the first to third sub areas L2_S1 to L2_S3 may be allocated to the first to third data caches L1D_1 to L1D_3, respectively. That is, data stored in the first data cache L1D_1 may be synchronized with the first sub area L2_S1; data stored in the second data cache L1D_2 may be synchronized with the second sub area L2_S2; and data stored in the third data cache L1D_3 may be synchronized with the third sub area LS_S3. In this case, data coherence may be maintained.

For example, it is assumed that the same first data is stored in the first and second data caches L1D_1 and L1D_2. At this point, when first data is changed in the first data cache L1D_1 by the first core 101_1, first data stored in the second data cache L1D_2 is different from the changed first data. In this case, data coherence is not maintained. However, as mentioned above, when different sub areas in the level-2 sharing cache 112 are allocated to the first and second data caches L1D_1 and L1D_2, even if data is changed in the first data cache L1D_1, since the second core 101_2 or the third core 101_3 accesses the first data cache L1D_1 in order to access data corresponding to the first sub area L2_S1, data coherence may be maintained.

Figure 4:
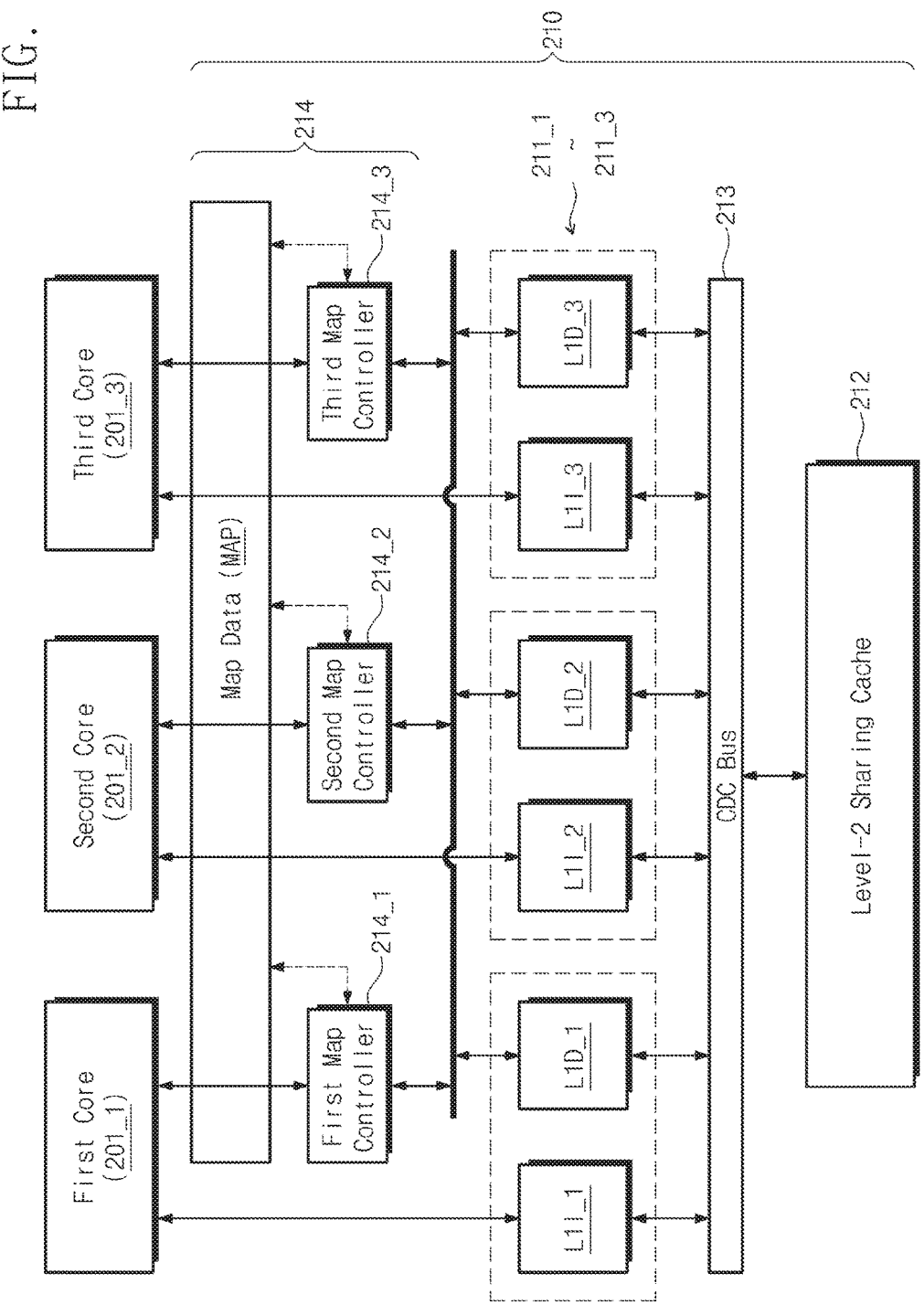
FIG. 4 is a block diagram illustrating a cache memory according to an embodiment of the inventive concept.

FIG. 4 is a block diagram illustrating a cache memory according to an embodiment of the inventive concept. Referring to FIG. 4, a cache memory 110 may include first to third level-1 caches 211_1 to 212_3, a level-2 sharing cache 212, a CDC bus 213, and a coherence controller 214.

In example embodiments, the cache memory 210 of FIG. 4 further includes the coherence controller 214 in comparison to the cache memory 110 of FIG. 2. In example embodiments, the coherence controller 214 may be disposed outside a cache memory or inside a plurality of cores 201_1 to 201_3.

The coherence controller 214 may include map data MAP and first to third map controllers 214_1 to 214_3. The map data MAP may include mapping information on the IDs of the first to third data caches and the page ID of data (for example, page unit data). In example embodiments, the mapping information may be updated by the first to third map controllers 214_1 to 214_3. In example embodiments, the map data MAP may be stored in an additional storage circuit.

The first to third map controllers 214_1 to 214_3 are configured to communicate with the first to third cores 201_1 to 201_3, respectively. Each of the first to third map controllers 214_1 to 214_3 may manage a mapping relationship between each of the first to third data caches L1D_1 to L1D_3 and the level-2 sharing cache 212.

For example, the cache memory 110 described with reference to FIG. 3 allocates sub areas predetermined in the level-2 sharing cache 112 to the first to third data caches L1D_1 to L1D_3, respectively. Unlike this, the cache memory 210 of FIG. 4 may vary an allocation area of the level-2 sharing cache 212 for each of the first to third data caches L1D_1 to L1D_3 on the basis of access frequency, access order, and the number of pages allocated to a data cache from the first to third cores 201_1 to 201_3.

As a more detailed example, it is assumed that the first core 201_1 accesses first data. At this point, the first map controller 214_1 may allocate an area corresponding to first data among areas of the level-2 sharing cache 214 to the first data cache L1D_1, and store information (for example, page ID and ID of first data cache L1D_1) on the first data in the map data MAP. Then, when the second core 201_2 accesses the first data, the second map controller 214_2 may provide the first data from the first data cache L1D_1 to the second core 201_2 by referring to the map data MAP.

That is, when the first core 201_1 accesses specific data, the first map controller 214_1 may determine whether the specific data is stored in the first to third data caches L1D_1 to L1D_3 by referring to the map data MAP. If the specific data is not stored in the first to third data caches L1D_1 to L1D_3, the first map controller 214_1 may allocate an area of the level-2 sharing cache 212 corresponding to the specific data to the first data cache L1D_1 and store allocation information in the map data MAP.

According to the above-mentioned embodiment of the inventive concept, since the cache memory 210 maintains data coherence and also allocates an area of the level-2 sharing cache 212 to a data cache variably according to an access order and an access frequency of each of a plurality of cores, access speed is improved.

Figure 5:
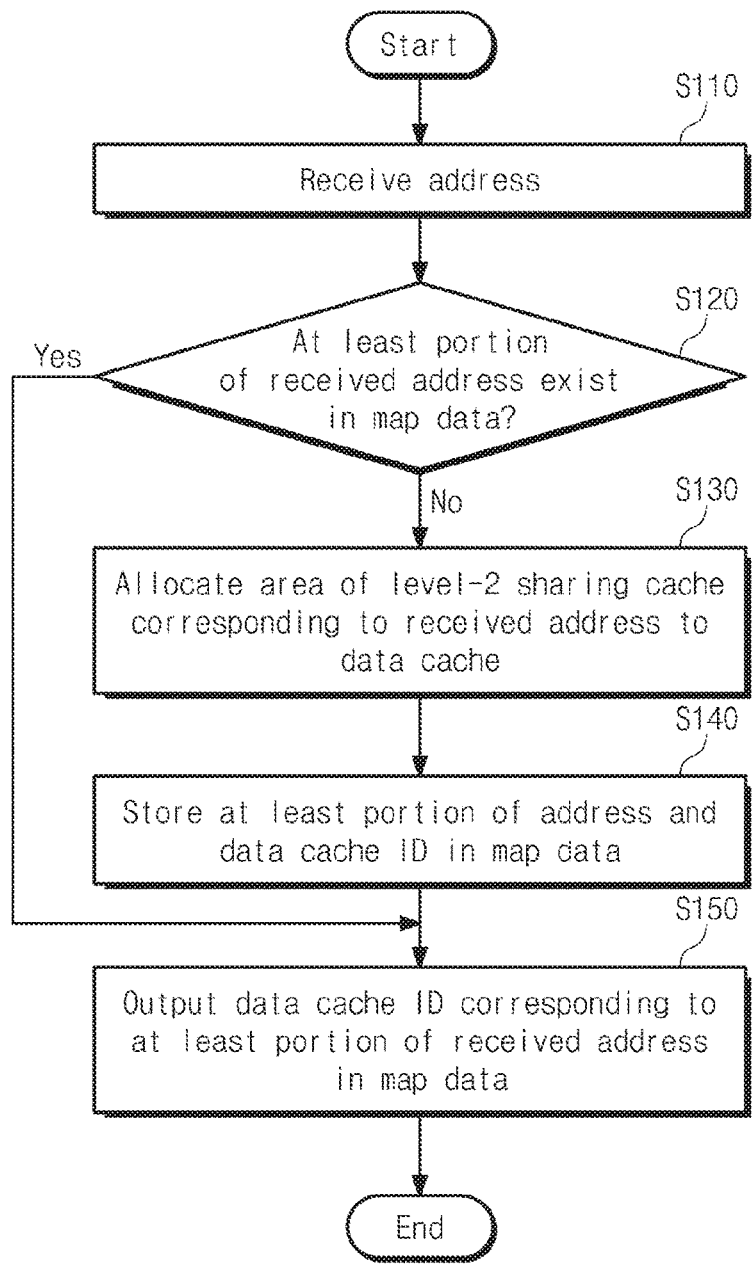
FIG. 5 is a flowchart illustrating an operation of a coherence controller of FIG. 4.

FIG. 5 is a flowchart illustrating an operation of a coherence controller of FIG. 4. Referring to FIGS. 4 and 5, in step S110, the coherence controller 214 may receive an address. For example, the coherence controller 214 may receive an address from the first core 201_1.

In step S120, the coherence controller 214 may determine whether at least a portion of a received address exists in map data MAP. For example, the received address may indicate data or a storage area to be accessed by the first core 201_1. As described with reference to FIG. 4, the map data MAP may include mapping information of a page ID and a data cache ID. In example embodiments, the page ID may be a portion of an address (for example, several to tens of upper-level bits).

If at least a portion of the received address does not exist in the map data MAP (that is, an area of a level-2 sharing cache corresponding to the received address is not allocated), in step S130, the coherence controller 214 may allocate an area of a level-2 sharing cache corresponding to the received address to a data cache. For example, if at least a portion of an address received from the first core 201_1 does not exist in map data, this means that an area of a level-2 sharing cache corresponding to the received address is not allocated to first to third data caches. In this case, as the coherence controller 214 allocates an area of a level-2 sharing cache corresponding to the received address to the first data cache L1D_1, the coherence controller 214 may synchronize the area of the level-2 sharing cache corresponding to the received address with the first data cache L1D_1.

In step S140, the coherence controller 214 may store at least a portion of an address and a data cache ID in map data. That is, when the first, second or third core 201_1, 201_2, or 201_3 re-accesses an area corresponding to the address, it may update map data to perform an access to the first data cache L1D_1.

In step S150, the coherence controller 214 may output a data cache ID corresponding to at least a portion of a received address in map data.

When a determination result of step S120 indicates that at least a portion of the received address exists in the map data, step S150 may be performed.

In example embodiments, an access to a data cache corresponding to an outputted data cache ID may be performed on the basis of the outputted data cache ID. In example embodiments, such an access operation may be performed through a sharing bus (that is, a bus that the first to third data caches share each other) or an additional control device (not shown).

Figure 6:
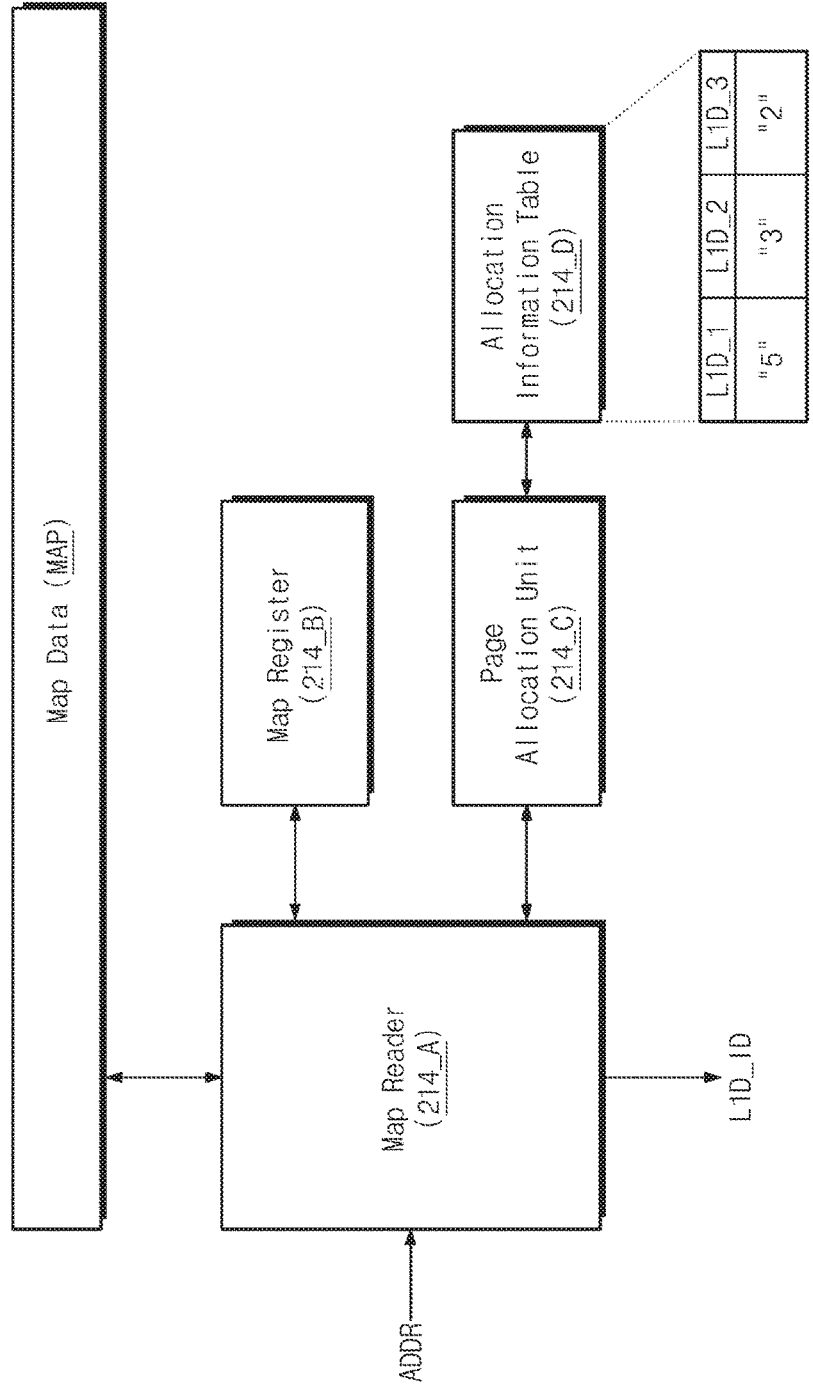
FIG. 6 is a block diagram illustrating a map controller FIG. 4.

FIG. 6 is a block diagram illustrating a map controller FIG. 4. For concise description, components unnecessary for describing a map controller are omitted. Additionally, although the first map controller 214_1 is mainly described with reference to FIG. 6, the scope of the inventive concept is not limited thereto, and the second and third map controller 214_2 and 214_3 or other map controllers may include the same or similar configuration.

Referring to FIGS. 4 to 6, the first map controller 214_1 may include a map reader 214_A, a map register 214_B, a page allocation unit 214_C, and an allocation information table 214_D.

The map reader 214_A may receive an address ADDR from the first core 201_1. In example embodiments, the address ADDR may include information (or bits) on a page ID, an index, and an offset. The map reader 214_A may determine whether there is data corresponding to the received address ADDR in the first to third data caches L1D_1 to L1D_3 on the basis of at least part (that is, a page ID) of the received address ADDR, map data MAP, and the map register 214B. When the determination result indicates that there is no corresponding data, the map reader 214_A may provide miss information to a page allocation unit.

The map register 214_B may include a page ID and a data cache ID, which are accessed recently by the map reader 214_A. In example embodiments, the map register 214_B may include a portion of mapping information in the map data MAP. That is, since the map register 214_B includes a page ID and a data cache ID, which are accessed recently by the map reader 214_A, the map reader 214_A first scans the map register 214_B, thereby the cache hit rate may be improved.

The page allocation unit 214_C may allocate a data cache of one among the first to third data caches L1D_1 to L1D_3 in response to the miss information from the map reader 214_A. For example, the page allocation unit 214_C may allocate a data cache where data corresponding to the received address ADDR is to be stored. Since the address ADDR is allocated from the first core 201_1, the page allocation unit 214_C may allocate the first data cache L1D_1 in order to store data corresponding to the first data cache L1D_1 that is the direct L1 cache of the first core 201_1.

In example embodiments, the page allocation unit 214_C may allocate one of the first to third data caches L1D_1 to L1D_3 based on the page allocation information 214_D. For example, the page allocation information 214_D may include information on the number of pages allocated to the first to third data caches L1D_1 to L1D_3. If the number of pages allocated to the first data cache L1D_1 exceeds a threshold, the page allocation unit 214_C may allocate the second or third data cache L1D_2 or L1D_3 through round-robin.

As a more detailed example, it is assumed that the number of pages allocated to the first data cache L1D_1 is five, the number of pages allocated to the second data cache L1D_2 is three, and the number of pages allocated to the third data cache L1D_3 is two. In this case, the page allocation unit 214_C may determine whether the number (that is, allocation information) of pages allocated to the direct L1 cache (that is, the first data cache L1D_1) of a core (that is, the first core 201_1) that receives the address ADDR exceeds a threshold on the basis of the page allocation information 214_C. As the threshold is six, if the number of pages allocated to the direct L1 cache (that is, the first data cache L1D_1) does not exceed the threshold, the page allocation unit 214_C allocates a page corresponding to the first data cache L1D_1 in order to store data corresponding to the first data cache L1D_1. As the threshold is "4", if the number of pages allocated to the direct L1 cache (that is, the first data cache L1D_1) exceeds the threshold, the page allocation unit 214_C may allocate a page in order to allow data corresponding to the third data cache L1D_3 having the smaller number of allocated pages among the second and third data caches L1D_2 and L1D_3 to be stored. The page allocation unit 214_C provides the data cache ID(L1D_ID) of a data cache where a page is allocated, to the map reader 214_A. The map reader 214_A may store the received data cache ID and part (that is, page ID) of the address ADDR in the map data MAP, and output the received data cache ID(L1D_ID) to allow data corresponding to the received address ADDR to be accessed.

In example embodiments, a page allocation number of each of the data caches L1D_1, L1D_2, and L1D_3 in the allocation information table 214_D may be different from the number of pages that are actually allocated to each data cache. For example, the allocation information table 214_D may be updated under a specific condition. For example, as a more detailed example, it is assumed that the number of pages allocated to the first data cache L1D_1 is five, the number of pages allocated to the second data cache L1D_2 is three, and the number of pages allocated to the third data cache L1D_3 is two. When a threshold is five, even if an access occurs by the first core 201_1, a page is not allocated to the first data cache L1D_1. In this case, by reducing the number of pages in the allocation information table 214_D by one as a whole, a page may be allocated to the first data cache L1D_1. That is, in relation to the number of pages stored in the allocation information table 214C, the first data cache L1D_1 may be reduced to "4", the second data cache L1D_2 may be reduced to "2", and the third data cache L1D_3 may be reduced to "1". At this point, pages that are actually allocated to data caches are maintained and a value referenced by an allocation information table is reduced simply.

That is, when the number of pages corresponding to one data cache stored in the allocation information table 214D exceeds a threshold and the number of pages corresponding to another data cache is equal to or greater than "1", the number of pages for each data cache may be reduced by "1".

As mentioned above, as a page is allocated to a data cache according to an access order of a core, data coherence may be maintained and an access speed for cache memory may be improved. Additionally, by comparing an allocated page number and a threshold and allocating a page through round-robin according to a compassion result, it is possible to prevent page allocation from being concentrated on one data cache. Accordingly, a cache memory having improved performance and reliability is provided.

Figure 7:
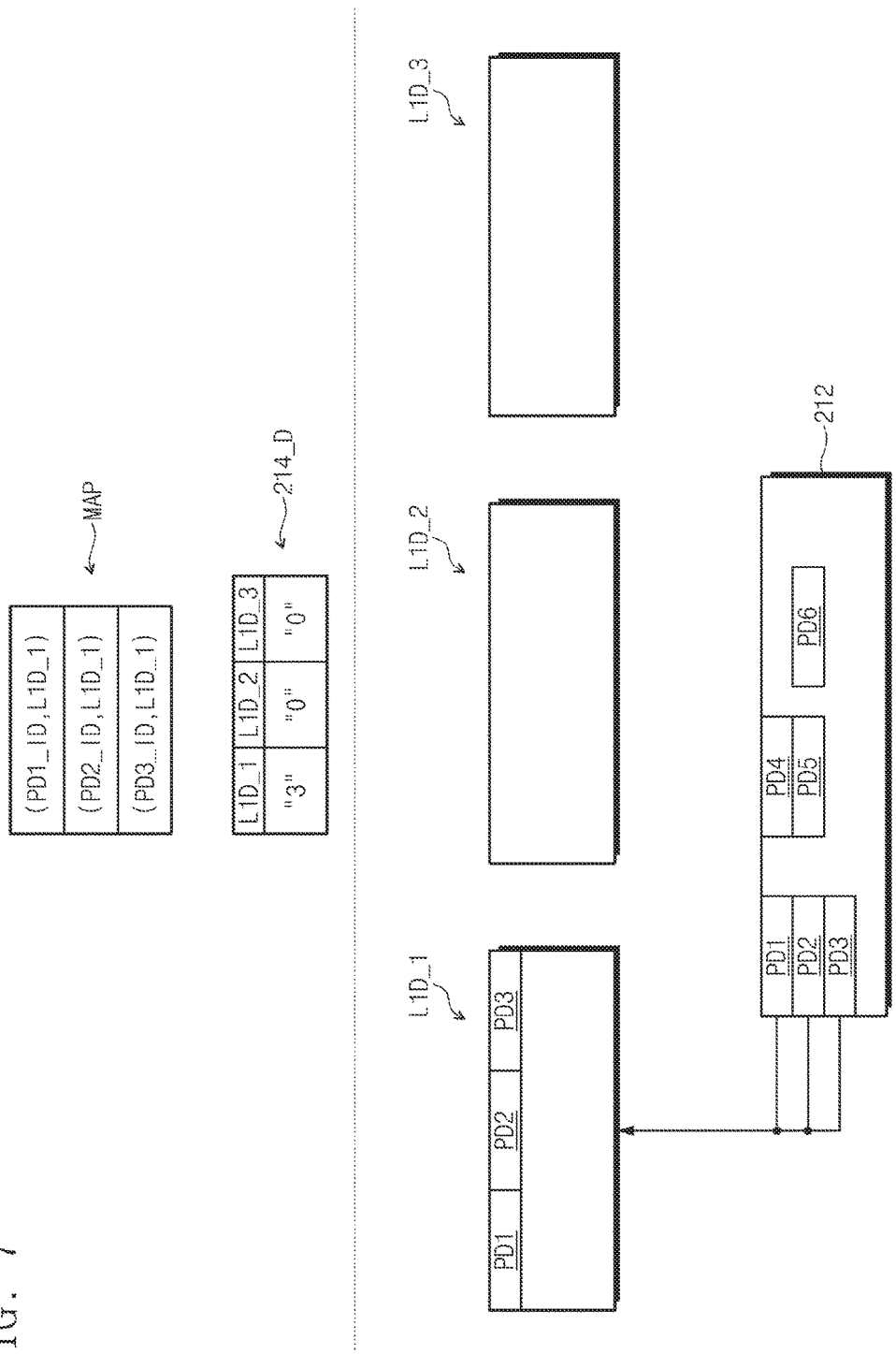
FIGS. 7 to 9 are views illustrating an operation of a first map controller of FIG. 6.
Figure 8:
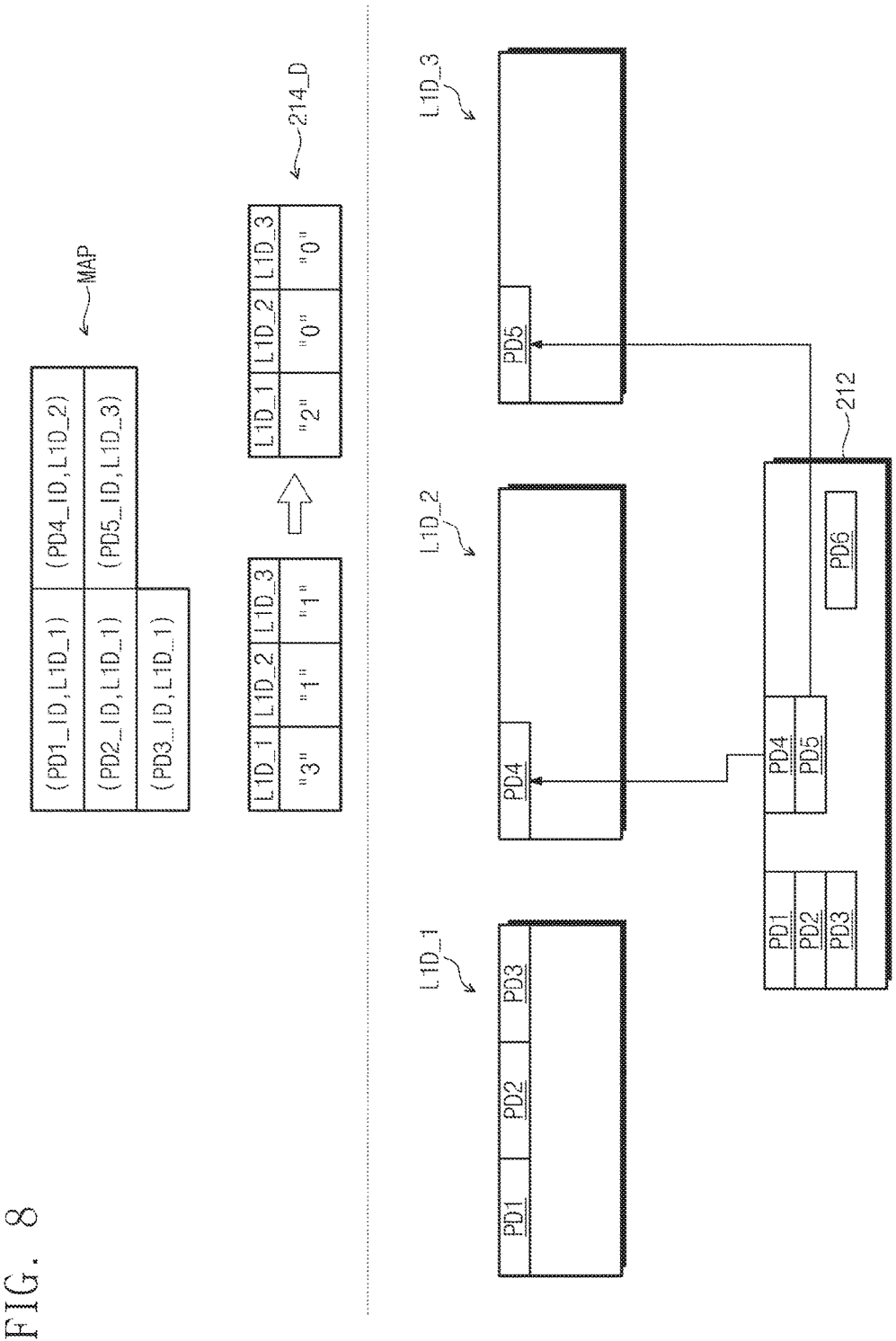
Figure 9:
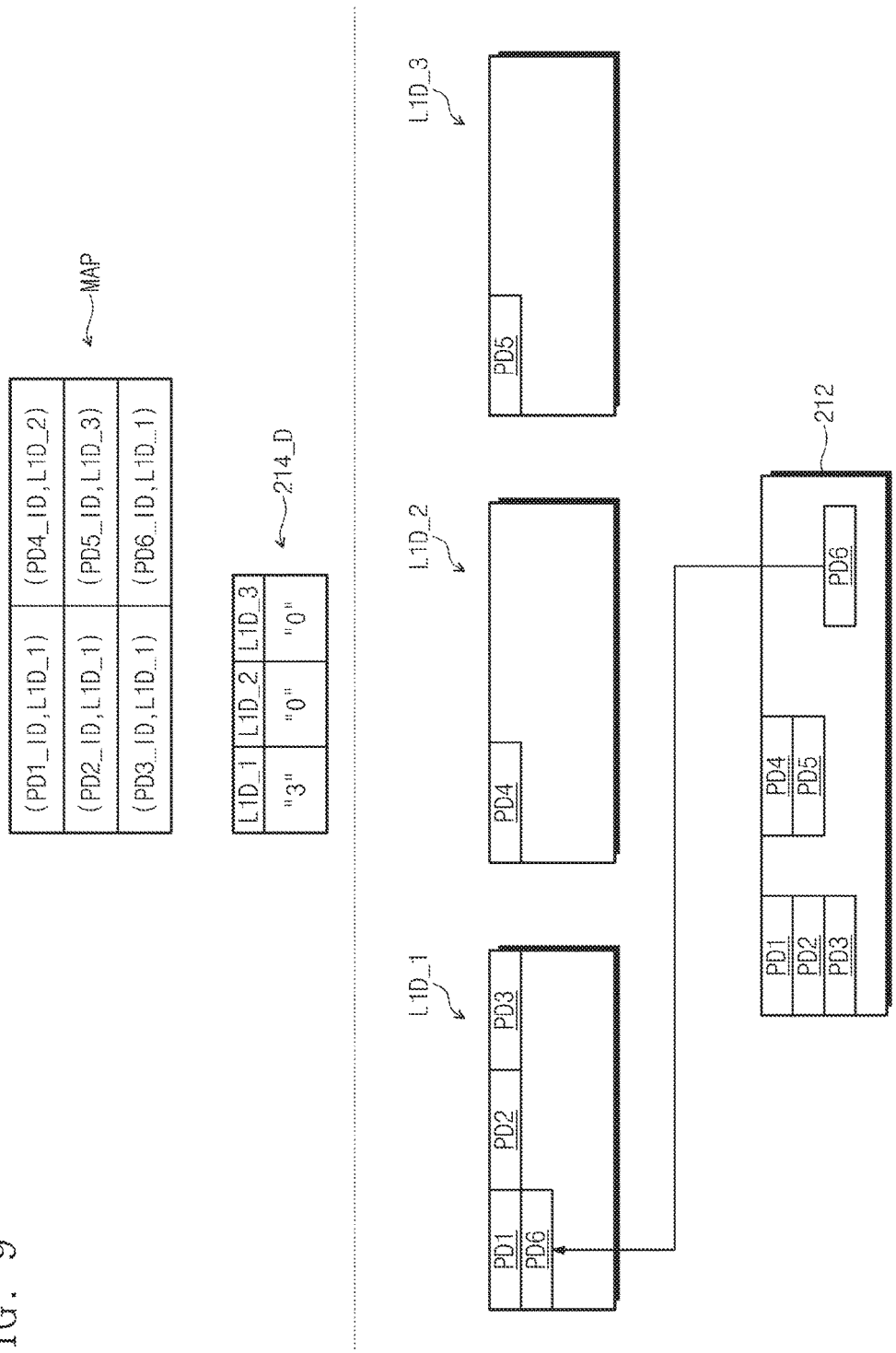

FIGS. 7 to 9 are views illustrating an operation of a first map controller of FIG. 6. For concise description, components unnecessary for describing an operation of the first map controller 214_1 are omitted. Additionally, for concise description, it is assumed that a page data access described with reference to FIGS. 7 to 9 is an access by the first core 201_1. Additionally, it is assumed that there is no page allocated to the first to third data caches L1D_1 to L1D_3. Additionally, it is assumed that first to sixth page data PD1 to PD6 exist in the level-2 sharing cache 212.

Although it is shown in FIGS. 7 to 9 that the first to sixth page data PD1 to PD6 are aligned in the level-2 sharing cache 212, the scope of the inventive concept is not limited thereto. Each of the first to sixth page data PD1 to PD6 is not classified as a specific area on the level-2 sharing cache 212 and may be a simple access unit. It is assumed that the first core 201_1 accesses the first to sixth page data PD1 to PD6 sequentially.

Additionally, "allocating page data to a data cache" means that as an area where page data is stored among areas of the level-2 sharing cache 212 is allocated to a corresponding data cache, when an area of the level-2 sharing cache 212 allocated later is accessed, an access is performed from a corresponding data cache.

The above-mentioned description and assumption are just examples for describing an embodiment of the inventive concept, and the technical idea of the inventive concept is not limited thereto.

First, referring to FIGS. 4, 6, and 7, an access to the first to third page data PD1 to PD3 may be performed from the first core 201_1. At this point, as described with reference to FIGS. 4 to 6, the cache memory 210 may allocate the first to third page data PD1 to PD3 stored in the level-2 sharing cache 212 to the first data cache L1D_1.

The cache memory 210 may store information (that is, page ID) on the allocated page data PD1 to PD3 and information on the first data cache L1D_1 in the map data MAP. Then, the cache memory 210 may increase a value corresponding to the first data cache L1D_1 by the number of pages allocated to the allocation information table 214_D. That is, a value corresponding to the first data cache L1D_1 of the allocation information table 214_D may be "3".

The cache memory 210 may store allocated information in the map data MAP. The allocated information may include information (that is, (PD1_ID, L1D_1), (PD2_ID, L1D_1), and (PD3_ID, L1D_1)) on the ID of page data and a data cache where page data is allocated.

Then, referring to FIGS. 4, 6, and 8, the first core 201_1 may perform an access operation on the fourth and fifth page data PD4 and PD5 sequentially. In example embodiments, as described above, a threshold for the number of pages allocated to each data cache may be "3". In this case, since page allocation information of the first data cache L1D_1 is three, the cache memory 210 may allocate page data to the second or third data cache L1D_2 or L1D_3 different from the first data cache L1D_1 that is the direct L1 cache. For example, when the first core 201_1 accesses the fourth page data PD4, since the allocation page number (that is, three) of the first data cache L1D_1 that is the direct L1 cache of the first core 201_1 is not smaller than the threshold (that is, three), the cache memory 210 may allocate the fourth page data PD4 to the second data cache L1D_2. Then, when the first core 201_1 accesses the fifth page data PD5, since the allocation page number (that is, three) of the first data cache L1D_1 that is the direct L1 cache of the first core 201_1 is not smaller than the threshold (that is, three), the fifth page data PD5 may be allocated to the third data cache L1D_1 having the smaller number of allocated pages among the second and third data caches L1D_2 and L1D_3 (because the second data cache L1D_2 has a value of "2" in the allocation information table as the fourth page data PD4 is allocated).

In example embodiments, after an access operation on the fifth page data PD5 is completed, the allocation information table 214_D may have values of "3", "1", and "1" with respect to the first to third data caches L1D_1 to L1D_3. As described above, in the following access operation, in order to prevent page data from being allocated to the first data cache L1D_1, the allocation information table 214_D may be configured to have values of "2", "0", and "0" with respect to the first to third data caches L1D_1 to L1D_3. That is, page allocation information may be reduced by at least "1" with respect to each data cache.

The cache memory 210 may store allocated information in the map data MAP. The allocated information may include information (that is, (PD4_ID, L1D_2), (PD5_ID, L1D_3)) on the ID of page data and a data cache where page data is allocated.

In example embodiments, even if the number of allocated pages is reduced in the allocation information table 214_D, allocation information of the map data MAP may be maintained. That is, then, referring to FIGS. 4, 6, and 9, the first core 201_1 may perform an access operation on the sixth page data PD6. After an operation described with reference to FIG. 8, an allocation page number of the first data cache L1D_1 stored in the allocation information table 214_D may be "2". That is, since the allocation page number (that is, "2") of the first data cache L1D_1 stored in the allocation information table 214_D is smaller than the threshold (that is, "3"), the cache memory 210 may allocate the sixth page data PD6 to the first data cache L1D_1 that is the direct L1 cache of the first core 201_1.

Then, the cache memory 210 may set the allocation page number on the first data cache L1D_1 to "3" in the allocation information table 214_D. The cache memory 210 may store allocated information in the map data MAP. The allocated information may include information (that is, (PD6_ID, L1D_1)) on the ID of page data and a data cache where page data is allocated.

As mentioned above, the cache memory 210 according to the inventive concept may maintain data coherence by allocating different page data to a plurality of level-1 caches according to an access order of a plurality of cores. Furthermore, by allocating page data to the direct L1 cache first according to an access order of a plurality of cores, a data access speed may be improved. Accordingly, a cache memory having improved performance and reliability is provided.

Figure 10:
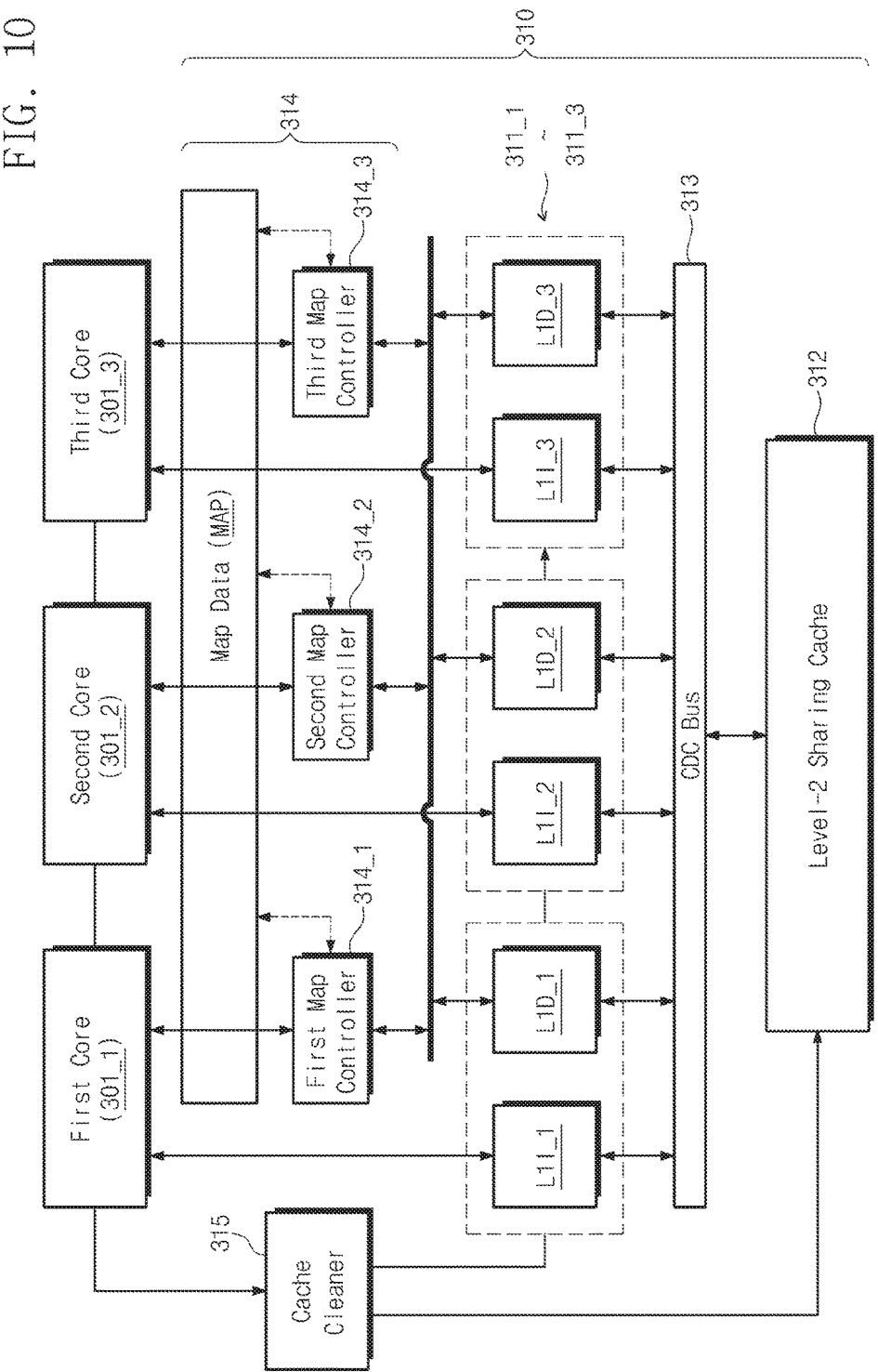
FIG. 10 is a block diagram illustrating a cache memory according to an embodiment of the inventive concept.

FIG. 10 is a block diagram illustrating a cache memory according to an embodiment of the inventive concept. For concise description, detailed descriptions for the above-mentioned components are omitted. Referring to FIG. 10, a cache memory 310 may include first to third level-1 caches 311_1 to 311_3, a level-2 sharing cache 312, a CDC bus 313, a coherence controller 314, and a cache eraser 315.

The cache memory 310 of FIG. 10 further includes the cache eraser 315 in comparison to the cache memory 210 of FIG. 4. The cache eraser 315 may support an erase operation on the first to third level-1 caches 311_1 to 311_3 and the level-2 sharing cache 312. For example, the first to third cores 301_1 to 301_3 may output a cache erase instruction for erasing data stored in the level-1 caches 311_1 to 311_3 and the level-2 cache 312. The cache eraser 315 may flush data in dirty state among data stored in the level-1 caches 311_1 to 311_3 with the level-2 sharing cache 312 in response to the cache erase instruction, and after the flushing is completed, delete data stored in the level-1 caches 311_1 to 311_3. After an erase operation on the first to third level-1 caches 311_1 to 311_3 is completed, the cache eraser 315 may control an erase operation on the level-2 sharing cache 312.

In example embodiments, the cache eraser 315 may include a plurality of address sets for a cache erase operation. In example embodiments, the plurality of address sets may include a start address and an end address. When receiving a cache erase instruction, the cache eraser 315 may transmit at least one of a plurality of address sets to a level-1 cache and a level-2 sharing cache, and the level-1 cache and the level-2 sharing cache may erase data included in a range corresponding to at least one received address set.

In example embodiments, when a cache erase instruction is received from one of the plurality of cores 301_1 to 301_3, the cache eraser 315 may provide a first cache erase instruction to the remaining cores. The remaining cores may recognize that an erase operation on a cache memory is being performed based on a first cache erase instruction and may not perform an additional access operation. After completing an erase operation on the level-2 sharing cache 312, the cache eraser 315 may provide an erase completion signal to the plurality of cores 301_1 to 301_3. The plurality of cores 301_1 to 301_3 may perform another access operation after receiving the erase completion signal.

Figure 11:
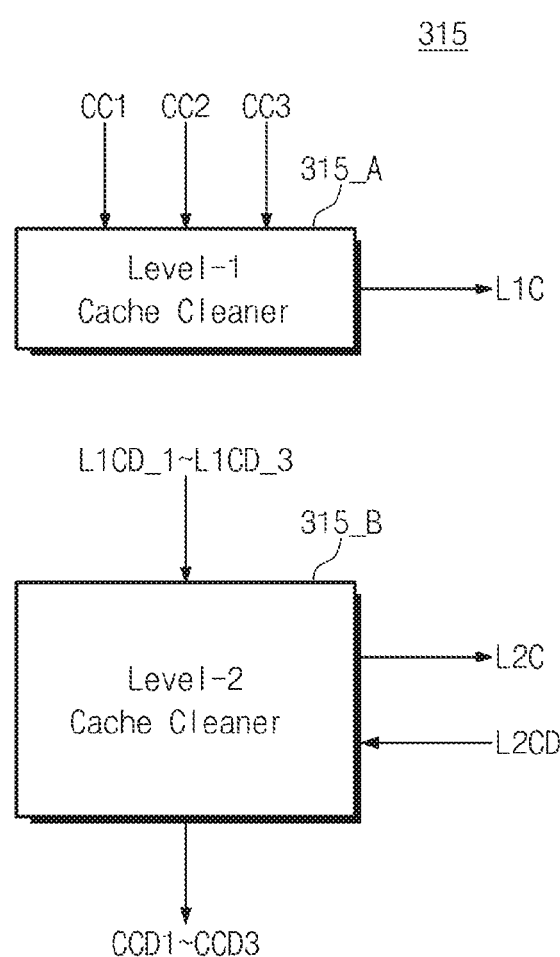
FIG. 11 is a block diagram illustrating a cache eraser of FIG. 10.

FIG. 11 is a block diagram illustrating a cache eraser of FIG. 10. For concise description, components unnecessary for describing a configuration and operation of the cache eraser 315 are omitted. Referring to FIGS. 10 and 11, the cache eraser 315 may include a level-1 cache cleaner 315_A and a level-2 cache cleaner 315_B. The level-1 cache cleaner 315_A and the level-2 cache cleaner 315_B may be implemented with hardware or software.

The level-1 cache cleaner 315_A may receive first to third cache clear signals CC1 to CC3 from the first to third cores 301_1 to 301_3. The first to third cache clear signals CC1 to CC3 may be signals for erasing the cache memory 310.

The level-1 cache cleaner 315_A may provide the level-1 cache clear signal L1C to the level-1 caches 311_1 to 311_3 (especially, the first to third data caches L1D_1 to L1D_3) in response to at least one of the first to third cache clear signals CC1 to CC3. In example embodiments, the level-1 cache cleaner 315_A may provide the level-1 cache clear signal L1C to the first to third cores 301_1 to 301_3, and the first to third cores 301_1 to 301_3 may not perform an additional access operation during a cache erase operation in response to the level-1 cache clear signal L1C.

In example embodiments, as described with reference to FIG. 10, the cache eraser 315 may include a plurality of address sets. The level-1 cache cleaner 315_A may provide at least one set (that is, an address set corresponding to an area to be erased) of a plurality of address sets to the level-1 caches 311_1 to 311_3, in addition to the level-1 cache clear signal L1C. The level-1 caches 311_1 to 311_3 may erase data corresponding to at least one received address set in response to the level-1 cache clear signal L1C. In example embodiments, the coherence controller 311 may erase mapping information corresponding to at least one address set from the map data MAP. After completing an erase operation, the level-1 caches 311_1 to 311_3 may provide level-1 cache clear completion signals L1CD_1 to L1CD_3 to the cache eraser 315.

The level-2 cache cleaner 315_B may provide a level-2 cache clear signal L2C to the level-2 sharing cache 312 in response to the level-1 cache clear completion signals L1CD_1 to L1CD_3. Like the level-1 cache cleaner 315_A, the level-2 cache cleaner 315_B may provide at least one set (that is, an address set corresponding to an area to be erased) of a plurality of address sets to the level-2 sharing cache 312. The level-2 sharing cache 312 may erase data corresponding to at least one received address set in response to the level-2 cache clear signal L2C. After completing an erase operation, the level-2 sharing cache 312 may output a level-2 cache clear completion signal L2CD.

The level-2 cache cleaner 315_B may receive the level-2 cache clear completion signal L2CD, and in response to the received level-2 cache clear completion signal L2CD, provide the first to third cache clear signals CCD1 to CCD3 to the first to third cores 301_1 to 301_3, respectively. Each of the first to third cores 301_1 to 301_3 may perform the following access operation in response to the first to third cache clear signals CC1 to CC3.

In example embodiments, the above-mentioned embodiment of the inventive concept relates to a cache memory including a plurality of level-1 caches and a level-2 sharing cache. However, the scope of the inventive concept is not limited thereto, and a structure of a cache memory may be implemented in a plurality of levels, and in a structure where a lower level of cache memory is shared, the technical idea of the inventive concept may be applied.

According to the above-mentioned embodiments of the inventive concept, by variably adjusting an area (that is, page data) allocated to a plurality of level-1 caches based on an access order and a page allocation number of each of a plurality of cores, a cache memory may maintain the coherence on cache data. Furthermore, by allocating page data to the direct L1 cache first according to an access order of each of a plurality of cores, a data access speed may be improved. Accordingly, a cache memory having improved performance and reliability and an operation method thereof are provided.

According to the inventive concept, a cache memory maintains data coherence and also allocates an area of a level-2 sharing cache to a data cache variably according to an access order and an access frequency of each of a plurality of cores. Accordingly, a cache memory having improved reliability and performance and an operation method thereof are provided.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A cache memory for first to Nth cores, N being a natural number greater than 1, the cache memory comprising:
   first to Nth level-1 caches corresponding to the first to Nth cores, respectively;
   a level-2 sharing cache configured to be shared by the first to Nth level-1 caches, the level-2 sharing cache including first to Nth sub-areas for allocation respectively to the first to Nth level-1 caches; and
   a coherence controller having stored therein map data including identifying data for data stored in the level-2 sharing cache by each of the first to Nth cores, the coherence controller configured to
   receive an address from one of the first to Nth cores, determine whether the received address is included in the map data, based on determining that the received address is included in the map data, retrieve data corresponding to the received address from one of the first to Nth level-1 caches based on the map data, and based on determining that the data corresponding to the address is not included in the map data, allocate at least a partial area of an area of the level-2 sharing cache to one of the first to Nth level-1 caches based on the received address, the allocated partial area being in one of the sub-areas corresponding to said one level-1 cache.

2. The cache memory of claim 1, wherein the at least partial area corresponds to a data unit accessed by each of the first to Nth cores.

3. A cache memory, comprising:
first to Nth level-1 caches configured to correspond to first to Nth cores, respectively, N being a natural number greater than 1;
a level-2 sharing cache configured to be shared by the first to Nth level-1 caches; and
a coherence controller including
a storage circuit configured to store map data, and
first to Nth map controllers configured to
respectively receive addresses from the first to Nth cores,
allow the first to Nth level-1 caches to respectively access data corresponding to the received addresses,
allocate at least a portion of the level-2 sharing cache to one of the plurality of level-1 caches,
determine whether the received addresses are located in the map data, and
based on determining that a first received address among the received addresses is located in the map data, providing data corresponding to the first received address from one of the plurality of level-1 caches to a requesting core among the first to Nth cores.

4. The cache memory of claim 3, wherein the first to Nth map controllers are configured to communicate with the plurality of level-1 caches through a sharing bus.

5. The cache memory of claim 3, wherein the first map controller among the first to Nth map controllers receives the address from the first core among the first to Nth cores, and when information corresponding to at least a portion of the received address is not included in the map data, allocates an area where page data corresponding to the received address is stored in an area of the level-2 sharing cache to the first level-1 cache.

6. The cache memory of claim 5, wherein the first map controller stores information on an ID of the first level-1 cache and an ID of the page data in the map data.

7. The cache memory of claim 3, wherein the first map controller among the first to Nth map controllers comprises:
a map reader configured to receive the address from the first core and determine whether at least the portion of the received address is included in the map data; and
a page allocation unit, when at least the portion of the received address is not included in the map data, configured to allocate an area where page data corresponding to the receive address in an area of the level-2 sharing cache to one of the first to Nth level-1 caches on the basis of an allocation information table.

8. The cache memory of claim 7, wherein the coherence controller further comprises an allocation information table comprising page allocation information allocated to each of the first to Nth level-1 caches,
wherein the page allocation unit is configured to allocate an area where the page data is stored to one of the first to Nth level-1 caches on the basis of the allocation information table.

9. The cache memory of claim 8, wherein when page allocation information on the first level-1 cache is less than a threshold, the page allocation unit allocates an area where the page data is stored to the first level-1 cache, and when the page allocation information on the first level-1 cache is greater than the threshold, allocates the area where the page data is stored to a level-1 cache having the smallest page allocation information among the second to Nth level-1 caches.

10. The cache memory of claim 1, wherein each of the first to Nth level-1caches comprises:
an instruction cache configured to store an instruction used in each of the first to Nth cores; and
a data cache configured to temporarily store data used in the first to Nth cores.

11. The cache memory of claim 1, wherein each of the first to Nth level-1caches operates based on a clock frequency different from that of the level-2 sharing cache, and each of the first to Nth level-1 caches communicates with the level-2 sharing cache through a bus having a clock domain crossing (CDC) function.

12. The cache memory of claim 1, further comprising a cache eraser configured to receive a cache clear signal from at least one of the first to Nth cores, and erase the first to Nth level-1 caches and the level-2 sharing cache sequentially in response to the received cache clear signal, wherein the cache eraser erases the first to Nth level-1 caches and the level-2 sharing cache sequentially on the basis of at least one among a plurality of address sets.

13. An operation method of a cache memory comprising a plurality of level-1 caches and a level-2 sharing cache, the method comprising:
receiving an address from an external core;
determining whether at least a portion of the received address is included in map data;
if at least the portion of the received address is not included in the map data, allocating an area where page data corresponding to the received address in an area of the level-2 sharing cache to one of the plurality of level-1 caches;
storing a cache ID of a level-1 cache where the area is allocated among the plurality of level-2 caches and at least a portion of the received address in the map data; and
performing an access operation on one of the plurality of level-1 caches on the basis of the map data.

14. The method of claim 13, wherein if at least the portion of the received address is not included in the map data, the allocating of the area where the page data corresponding to the received address in the area of the level-2 sharing cache to the one of the plurality of level-1 caches comprises allocating the area where the page data is stored to one of the plurality of level-1 caches on the basis of page allocation information comprising information on the number of pages allocated to the plurality of level-1 caches.

15. The method of claim 14, wherein the allocating of the area where the page data is stored to the one of the plurality of level-1 caches on the basis of the page allocation information comprising the information on the number of pages allocated to the plurality of level-1 caches comprises:

when allocation information on a level-1 cache corresponding to the external core among the plurality of level-1 caches is less than a threshold, allocating the area where the page data is stored to a level-1 cache corresponding to the external core; and when the allocation information on the level-1 cache corresponding to the external core among the plurality of level-1 caches is greater than the threshold, allocating the area where the page data is stored to one of the remaining level-1 caches.

16. The method of claim 15, wherein when the allocation information on the level-1 cache corresponding to the external core among the plurality of level-1 caches is greater than the threshold, the allocating of the area where the page data is stored to the one of the remaining level-1 caches comprises allocating the area where the page data is stored to a level-1 cache having the smallest allocation information among the remaining level-1 caches.

* * * * *